2,817,639
METHOD OF PREPARING ADHESIVES COMPRISING A PHENOLIC RESIN AND A PROTEIN

Jacob R. Ash and Alan L. Lambuth, Bellevue, Wash., assignors to Monsanto Chemical Company, St. Louis, Mo., a corporation of Delaware No Drawing. Application May 12, 1954
Serial No. 429,386

8 Claims. (Cl. 260—7)

This invention relates to plywood adhesives prepared from a water-soluble protein, sodium silicate and a phenol-formaldehyde resin. More particularly the invention relates to a process for the preparation of such adhesives whereby accurate control of the viscosity of the adhesive is attained.

Plywood adhesives based on aqueous dispersions of protein, sodium silicate and phenol-formaldehyde resins have the particular advantage that they can be partially set at press temperature ranges of 220° F. to 300° F. at substantially decreased pressing times over those normally used for phenol-formaldehyde adhesives. As a result the rate of production can be increased by 30 to 40%.

A major disadvantage of these adhesives has been the wide variation in viscosity even when the same or similar ingredients and the same mixing schedules are used.

One object of this invention is to provide a process for preparing plywood adhesives.

A further object is to provide a method for compounding plywood adhesives whereby control of viscosity is achieved.

These and other objects are attained by preparing the adhesive at a temperature of 80–100° F. and by controlling the time of addition of the sodium silicate and the duration of the mixing operation thereafter.

The following examples are given in illustration and not as limitations on the scope of this invention. Where parts are mentioned they are parts by weight.

Example I

Disperse 30 parts of soluble blood protein, 12 parts of soybean protein and 8 parts of bark flour in 100 parts of water at 95° F. Mix the ingredients together until a smooth lump-free dispersion is obtained. Add 75 parts of "N" type sodium silicate and 75 parts of water at 95° F. and mix all ingredients together for 1 minute. Immediately thereafter, add 5 parts of pine oil with continued mixing. Finally add 100 parts of a 40% solids solution of a phenol-formaldehyde resin having a pH of about 10 and 100 parts of water at 95° F. Continue the mixing until a smooth homogeneous dispersion is attained. This is the final adhesive or glue. It has a viscosity of from 20–25 on a 26d wire in a MacMichael viscosimeter.

If exactly the same procedure is followed except that the mixing time after the addition of the sodium silicate is increased to 5 minutes, the viscosity will be about 2600. If the mixing time is reduced to 30 seconds the viscosity will be about 10.

If the example is repeated except that the temperature is maintained at 70° F., the viscosity will be over 3000 even if the mixing time after addition of the sodium silicate is reduced to 10 seconds.

If the example is repeated except that the temperature is maintained at 100° F., the viscosity will be about 15–20.

If the pine oil is added with the protein and filler, a usable viscosity of about 15–20 is obtained by increasing the mixing time after addition of the sodium silicate to 8–10 minutes. If the pine oil is added with the resin the mixing time after addition of the sodium silicate should be reduced to about 10–30 seconds to attain a viscosity below 400.

When the sodium silicate is added with the protein, the viscosity is much too high by the time there is obtained a smooth dispersion to which the resin can be added to provide a smooth glue. This viscosity can be reduced to a workable range by adding large amounts of water but then the amount of adhesive material in the glue is too small to give a satisfactory bond. When the sodium silicate is added with the resin, viscosities vary widely and cannot be controlled by control of temperature or mixing time or a combination of both.

The essential ingredients of the adhesives of this invention are a water-soluble protein, sodium silicate, and a phenolformaldehyde resin.

The protein may be an animal protein such as soluble blood or it may be a vegetable protein such as soybean or zein flour or a mixture thereof. The amount of protein based on 100 parts of dry phenol-formaldehyde resin generally varies between 70–120 parts. The protein serves to give an initial set or bond at relatively low glue line temperatures, i. e. from 170–210° F.

The phenol-formaldehyde resin is a condensation product prepared by condensing 1 mol of phenol with 1.5–3 mols of formaldehyde under strongly alkaline conditions. The condensation reaction is carried out for a sufficient time to partially polymerize the resin and bind substantially all of the formaldehyde. Conveniently the resin is not recovered from the reaction medium, said reaction medium being used per se in the preparation of the adhesive. As a general rule, the solution contains from 35–50% resin solids by weight and has a pH of from 9–12.

The sodium silicate is most conveniently used in the form of the aqueous solution known as "N" type. This solution contains about 40% sodium silicate in which the ratio of sodium oxide to silicon dioxide is about 1:3.2. Other commercial types of aqueous sodium silicate solutions may be used as well as the dry sodium silicate itself. The amount of sodium silicate used may vary from 60–90 parts based on the dry weight per 100 parts of phenolic resin.

For most purposes it is advantageous to add a cellulosic filler to the adhesive. The filler serves the purpose of keeping the adhesive at the glue line and preventing its total absorption into the wood. Inert fillers such as wood flour, alpha floc, etc. may be used. However, it is preferred to use a bark flour such as certain fractions of Douglas Fir bark flour which contain minor amounts of reactive phenolic ingredients. The amount of filler may range from 15 to 25 parts per 100 parts of phenolic resin and should be added with the protein in the process for preparing the adhesive.

Since the adhesives of this invention show a marked tendency to foam during the process of preparing them, it is generally necessary to add a foam preventative. For this purpose aliphatic cyclic or acylic alcohols are preferred. Pine oil is an inexpensive and efficient defoamer. It is a by-product obtained in the preparation of turpentine and contains a high percentage by weight of terpene alcohols such as alpha terpineol. Other aliphatic alcohols such as cetyl, lauryl, stearyl, isopropyl, cyclohexyl etc. alcohol may be used alone or in admixture with each other or with other antifoaming agents. The amount of antifoaming agent may vary between 5 and 50 parts per 100 parts of phenolic resin and may be added with the protein or with the phenolic resin but preferably is added as an intervening step between the silicate addition and the phenolic resin addition.

The process of this invention involves a specific procedure under controlled conditions necessary to regulation of the viscosity of the finished glue.

The first step is to mix the protein and filler with water. The water should be at a temperature of 85–100° F. and the amount by weight should be substantially equal to the combined weight of the protein and filler. When no filler is used, the amount of water by weight should be substantially equal to the weight of the protein. The mixing operation should be continued long enough to attain a smooth lump-free dispersion. This can be accomplished in from 3–10 minutes. Care should be taken not to extend the mixing operation substantially beyond ten minutes.

Immediately after a lump-free dispersion is attained, the sodium silicate should be added together with enough water to be equivalent on a weight basis to 4 times the weight of silicate. If "N" type silicate is used the amount of water in the silicate should be taken into account. The sodium silicate shoulde be mixed with the dispersion for from 10 seconds to 10 minutes. This mixing operation is the most critical step in the process and controls the viscosity of the completed adhesive. As the length of the mixing operation is increased the viscosity of the final adhesion increases. If the proportions of ingredients and water temperature are so chosen as to produce a viscous glue the mixing time after addition of the sodium silicate should be from 10 to 60 seconds. On the other hand when the proportions of ingredients and temperature are so chosen as to produce a thin glue, the mixing time may be increased up to about 10 minutes.

Immediately after completion of this cycle the phenolic resin and more water should be added accompanied by a mixing cycle of from 1 to 30 minutes. The amount of water added should be equivalent on a weight basis to about 4 times the dry weight of the resin.

The antifoaming materials may be added with the protein, with the phenolic resin or after the sodium silicate mixing cycle and before the phenolic resin addition. When the materials are added immediately after the sodium silicate mixing cycle, they serve to stabilize the adhesives against further drastic viscosity changes. When added at this point, they should be mixed thoroughly with the dispersion. Depending on the amount of anti-foam used, the attainment of a homogeneous dispersion will take from 1 to 30 minutes. The phenolic resin should be added as soon as the homogeneous dispersion is obtained.

Throughout the mixing operation the temperature should be maintained at 85–100° F. either by use of a jacketed mixer or by preheating the water. In case a small unjacketed mixer is used from which heat dissipates rapidly it may be necessary to preheat the water to temperatures up to 140° F. in order to maintain the desired temperature range in the mixing operation. At temperatures either above or below the range specified the viscosity is much too high for practical operation.

The viscosities shown in the Examples are MacMichael numbers on a modified (26d) version of the MacMichael viscosimeter. To be satisfactory in the plywood adhesive field the viscosity must lie between 15 and 400.

It is of course obvious that the viscosity may be varied widely by changing the solids content of the glue. However, for preparing plywood, the glue must contain from 20 to 25% solids by weight. At lower solids content it is difficult to get enough active adhesive on the plies without oversoaking the wood with water. At higher solids content there is insufficient penetration of the wood resulting in substantial glue failure.

What is claimed is:

1. A process for preparing a plywood adhesive which comprises adding from 70–120 parts of a water-soluble protein to a substantially equal weight of water, mixing the protein and water together for from 3–10 minutes to form a smooth lump-free dispersion, immediately thereafter adding to the dispersion from 60–90 parts of sodium silicate and about 4 times its weight of water, mixing the sodium silicate and water with the dispersion for from 10 seconds to 10 minutes, and immediately thereafter adding 100 parts of a phenol-formaldehyde resin in the form of a 30–50% solids aqueous alkaline solution having a pH of 9–12 and sufficient water to make a total amount of water for this addition of about 4 times the dry weight of the resin, and mixing the resin with the dispersion for from 1 to 30 minutes, said resin being fusible, soluble in aqueous alkali and substantially free from uncombined formaldehyde, said process being carried out at 90–100° F.

2. A process as in claim 1 wherein from 5–50 parts of pine oil are added immediately after the sodium silicate mixing step is completed and wherein the pine oil is mixed with the disperison for from 1–30 minutes prior to addition of the phenolic resin.

3. A process as in claim 1 wherein the temperature is maintained at about 95° F. throughout the process.

4. A process as in claim 1 wherein from 15–25 parts of a cellulosic filler are mixed with the protein and water in the first step.

5. A process as in claim 4 wherein the cellulosic filler is a Dougles fir bark flour containing minor amounts of reactive phenolic components.

6. A process as in claim 1 wherein from 5–50 parts of a foam preventative is added to the adhesive.

7. A process as in claim 6 wherein the foam preventative is taken from the group consisting of cyclic and acyclic aliphatic alcohols.

8. A process as in claim 6 wherein the foam preventative is pine oil.

References Cited in the file of this patent

UNITED STATES PATENTS

| | | |
|---|---|---|
| 2,389,183 | Cone | Nov. 20, 1945 |
| 2,574,784 | Heritage | Nov. 13, 1951 |

FOREIGN PATENTS

| | | |
|---|---|---|
| 688,222 | Great Britain | Mar. 4, 1953 |